US007353383B2

(12) United States Patent
Skingle (10) Patent No.: US 7,353,383 B2
(45) Date of Patent: Apr. 1, 2008

(54) SYSTEM AND METHOD FOR SINGLE SESSION SIGN-ON WITH CRYPTOGRAPHY

(75) Inventor: Bruce James Skingle, Cambridge (GB)

(73) Assignee: JPMorgan Chase Bank, N.A., New York, NY (US)

( * ) Notice: Subject to any disclaimer, the term of this patent is extended or adjusted under 35 U.S.C. 154(b) by 737 days.

(21) Appl. No.: 10/389,526

(22) Filed: Mar. 14, 2003

(65) Prior Publication Data

US 2003/0177351 A1    Sep. 18, 2003

Related U.S. Application Data

(60) Provisional application No. 60/365,430, filed on Mar. 18, 2002.

(51) Int. Cl.
- H04L 9/00 (2006.01)
- G06F 7/04 (2006.01)
- G06F 7/58 (2006.01)
- G06F 15/16 (2006.01)
- G06F 17/30 (2006.01)
- G06K 9/00 (2006.01)

(52) U.S. Cl. .......................... 713/156; 726/4; 726/18; 726/21; 726/28; 726/5; 726/29

(58) Field of Classification Search ........................ 726/8
See application file for complete search history.

(56) References Cited

U.S. PATENT DOCUMENTS 3,705,385 A    12/1972    Batz
3,860,870 A    1/1975     Furuya
3,896,266 A    7/1975     Waterbury
3,938,091 A    2/1976     Atalla et al.
4,013,962 A    3/1977     Beseke et al.
4,321,672 A    3/1982     Braun et al.
4,567,359 A    1/1986     Lockwood
4,633,397 A    12/1986    Macco
4,695,880 A    9/1987     Johnson et al.
4,696,491 A    9/1987     Stenger
4,713,761 A    12/1987    Sharpe et al.

(Continued)

FOREIGN PATENT DOCUMENTS

CA    2430549    6/2002

(Continued)

OTHER PUBLICATIONS

Schneier, "Applied Cryptography, Second Edition", 1996, John Wiley & Sons, Inc., pp. 34-39.*

(Continued)

Primary Examiner—Ayaz Sheikh
Assistant Examiner—Arezoo Sherkat
(74) Attorney, Agent, or Firm—Hunton & Williams LLP (57) ABSTRACT

A method and system for single session sign-on across multiple content servers using public/private key cryptography. Session certificates are issued by an authentication authority and stored or held in volatile memory by a browser. Session certificates are used by browsers to obtain session credentials from a session authority and stored or held in volatile memory by the browser. Use of public and private keys supports authentication and non-repudiation, and eliminates some of the disadvantages of permanent certificates and PKI.

18 Claims, 3 Drawing Sheets

U.S. PATENT DOCUMENTS

| | | |
|---|---|---|
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,220,501 A | 6/1993 | Lawlor |
| 5,233,654 A | 8/1993 | Harvey et al. |
| 5,235,509 A | 8/1993 | Mueller et al. |
| 5,241,594 A | 8/1993 | Kung |
| 5,261,002 A * | 11/1993 | Perlman et al. ............... 380/30 |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Chang |
| 5,479,530 A | 12/1995 | Nair et al. |
| 5,485,370 A | 1/1996 | Moss et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,546,452 A | 8/1996 | Andrews |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,197 A | 12/1996 | Chen |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Gray et al. |
| 5,761,647 A | 6/1998 | Boushy |
| 5,761,661 A | 6/1998 | Coussens |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Mashayekhi |
| 5,819,092 A | 10/1998 | Ferguson |
| 5,819,285 A | 10/1998 | Damico |
| 5,825,863 A | 10/1998 | Walker |

| | | |
|---|---|---|
| 5,825,870 A | 10/1998 | Miloslavsky |
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,211 A | 11/1998 | Blakley, III et al. |
| 5,832,460 A | 11/1998 | Bednar |
| 5,832,476 A | 11/1998 | Tada |
| 5,835,087 A | 11/1998 | Herz |
| 5,835,580 A | 11/1998 | Fraser |
| 5,835,603 A | 11/1998 | Coutts |
| 5,838,903 A | 11/1998 | Blakely, III et al. |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,143 A | 12/1998 | Andrews |
| 5,848,400 A | 12/1998 | Chang |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,862,323 A | 1/1999 | Blakley, III et al. |
| 5,864,830 A | 1/1999 | Armetta et al. |
| RE36,116 E | 2/1999 | McCarthy |
| 5,866,889 A | 2/1999 | Weiss et al. |
| 5,870,718 A | 2/1999 | Spector |
| 5,870,724 A | 2/1999 | Lawlor |
| 5,870,725 A | 2/1999 | Belinger et al. |
| 5,871,398 A | 2/1999 | Schneier et al. |
| 5,872,844 A * | 2/1999 | Yacobi ........................ 705/69 |
| 5,873,072 A | 2/1999 | Kight |
| 5,873,096 A | 2/1999 | Lim |
| 5,880,769 A | 3/1999 | Nemirofsky |
| 5,883,810 A | 3/1999 | Franklin et al. |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Chang |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,933,816 A | 8/1999 | Zeanah |
| 5,933,817 A | 8/1999 | Hucal |
| 5,933,823 A | 8/1999 | Cullen |
| 5,933,827 A | 8/1999 | Cole |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,639 A | 9/1999 | Ohki |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 5,999,596 A | 12/1999 | Walker et al. |
| 5,999,907 A | 12/1999 | Donner |
| 6,000,033 A | 12/1999 | Kelley et al. |
| 6,001,016 A | 12/1999 | Walker et al. |
| 6,003,762 A | 12/1999 | Hayashida |
| 6,005,939 A | 12/1999 | Fortenberry et al. |
| 6,006,205 A | 12/1999 | Loeb et al. |
| 6,006,249 A | 12/1999 | Leong |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,032,134 A | 2/2000 | Weissman |
| 6,032,147 A | 2/2000 | Williams et al. |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |

| Patent No. | Date | Inventor |
|---|---|---|
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |
| 6,065,120 A | 5/2000 | Laursen et al. |
| 6,065,675 A | 5/2000 | Teicher |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,081,900 A | 6/2000 | Subramaniam et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,192 A | 7/2000 | Kanevsky et al. |
| 6,092,196 A * | 7/2000 | Reiche ............... 726/6 |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,111,858 A | 8/2000 | Greaves et al. |
| 6,112,181 A | 8/2000 | Shear et al. |
| 6,115,690 A | 9/2000 | Wong |
| 6,119,093 A | 9/2000 | Walker et al. |
| 6,119,099 A | 9/2000 | Walker et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,182 A | 12/2000 | Nadooshan |
| 6,164,533 A | 12/2000 | Barton |
| 6,170,011 B1 | 1/2001 | Beck et al. |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,220 B1 | 1/2001 | Chen et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,151 B1 | 3/2001 | Musgrave et al. |
| 6,202,158 B1 | 3/2001 | Urano et al. |
| 6,208,978 B1 | 3/2001 | Walker et al. |
| 6,208,984 B1 | 3/2001 | Rosenthal |
| 6,209,091 B1 * | 3/2001 | Sudia et al. ............... 713/175 |
| 6,216,115 B1 | 4/2001 | Barrameda et al. |
| 6,219,639 B1 | 4/2001 | Bakis et al. |
| 6,219,706 B1 | 4/2001 | Fan |
| 6,222,914 B1 | 4/2001 | McMullin |
| 6,226,623 B1 | 5/2001 | Schein et al. |
| 6,226,679 B1 | 5/2001 | Gupta |
| 6,226,752 B1 * | 5/2001 | Gupta et al. ............... 726/9 |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,256,664 B1 | 7/2001 | Donoho et al. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,834 B1 | 11/2001 | Gennaro et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,332,192 B1 | 12/2001 | Boroditsky et al. |
| 6,336,104 B1 | 1/2002 | Walker et al. |
| 6,343,279 B1 | 1/2002 | Bissonette et al. |
| 6,345,261 B1 | 2/2002 | Feidelson |
| 6,349,242 B2 | 2/2002 | Mahaffey |
| 6,349,336 B1 | 2/2002 | Sit et al. |
| 6,363,381 B1 | 3/2002 | Lee et al. |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,411,933 B1 | 6/2002 | Maes et al. |
| 6,418,421 B1 * | 7/2002 | Hurtado et al. ............... 705/54 |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,449,765 B1 | 9/2002 | Ballard |
| 6,453,353 B1 | 9/2002 | Win et al. |
| 6,460,141 B1 | 10/2002 | Olden |
| 6,487,641 B1 | 11/2002 | Cusson et al. |
| 6,493,677 B1 | 12/2002 | von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,507,912 B1 | 1/2003 | Matyas, Jr. et al. |
| 6,510,523 B1 | 1/2003 | Perlman et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,580,814 B1 | 6/2003 | Ittycheriah et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,589,291 B1 | 7/2003 | Boag et al. |

| | | |
|---|---|---|
| 6,592,044 B1 | 7/2003 | Wong et al. |
| 6,609,106 B1 | 8/2003 | Robertson |
| 6,609,113 B1 | 8/2003 | O'Leary et al. |
| 6,609,125 B1 | 8/2003 | Layne et al. |
| 6,609,198 B1 | 8/2003 | Wood et al. |
| 6,609,654 B1 | 8/2003 | Anderson et al. |
| 6,618,579 B1 | 9/2003 | Smith et al. |
| 6,618,806 B1 | 9/2003 | Brown et al. |
| 6,623,415 B2 | 9/2003 | Gates et al. |
| 6,640,302 B1 | 10/2003 | Subramaniam et al. |
| 6,668,322 B1 | 12/2003 | Wood et al. |
| 6,675,261 B2 | 1/2004 | Shandony |
| 6,684,384 B1 | 1/2004 | Bickerton et al. |
| 6,687,222 B1 | 2/2004 | Albert et al. |
| 6,687,245 B2 | 2/2004 | Fangman et al. |
| 6,697,947 B1 | 2/2004 | Matyas, Jr. et al. |
| 6,714,987 B1 | 3/2004 | Amin et al. |
| 6,718,482 B2 | 4/2004 | Sato et al. |
| 6,718,535 B1 | 4/2004 | Underwood |
| 6,725,269 B1 | 4/2004 | Megiddo |
| 6,735,695 B1 | 5/2004 | Gopalakrishnan et al. |
| 6,738,779 B1 | 5/2004 | Shapira |
| 6,751,654 B2 | 6/2004 | Massarani et al. |
| 6,754,833 B1 | 6/2004 | Black et al. |
| 6,755,341 B1 | 6/2004 | Wong et al. |
| 6,766,370 B2 | 7/2004 | Glommen et al. |
| 6,769,605 B1 | 8/2004 | Magness |
| 6,772,146 B2 | 8/2004 | Khemlani et al. |
| 6,785,810 B1 | 8/2004 | Lirov et al. |
| 6,789,115 B1 | 9/2004 | Singer et al. |
| 6,805,288 B2 | 10/2004 | Routhenstein et al. |
| 6,810,395 B1 | 10/2004 | Bharat |
| 6,819,219 B1 | 11/2004 | Bolle et al. |
| 6,820,202 B1 | 11/2004 | Wheeler et al. |
| 6,826,696 B1* | 11/2004 | Chawla et al. ............... 726/4 |
| 6,832,202 B1 | 12/2004 | Schuyler et al. |
| 6,847,991 B1 | 1/2005 | Kurapati |
| 6,856,970 B1 | 2/2005 | Campbell et al. |
| 6,892,231 B2 | 5/2005 | Jager |
| 6,892,307 B1* | 5/2005 | Wood et al. .................... 726/8 |
| 6,907,566 B1 | 6/2005 | McElfresh et al. |
| 6,925,481 B2 | 8/2005 | Singhal et al. |
| 6,934,848 B1* | 8/2005 | King et al. ................ 713/182 |
| 6,938,158 B2 | 8/2005 | Azuma |
| 6,950,936 B2 | 9/2005 | Subramaniam et al. |
| 6,957,337 B1 | 10/2005 | Chainer et al. |
| 6,965,939 B2 | 11/2005 | Cuomo et al. |
| 6,976,164 B1 | 12/2005 | King et al. |
| 6,980,962 B1 | 12/2005 | Arganbright et al. |
| 6,983,421 B1 | 1/2006 | Lahti et al. |
| 6,992,786 B1 | 1/2006 | Breding et al. |
| 7,010,512 B1 | 3/2006 | Gillin et al. |
| 7,020,696 B1 | 3/2006 | Perry et al. |
| 7,032,110 B1* | 4/2006 | Su et al. ..................... 713/156 |
| 7,058,817 B1 | 6/2006 | Ellmore |
| 7,080,036 B1 | 7/2006 | Drummond et al. |
| 7,089,208 B1 | 8/2006 | Levchin et al. |
| 7,089,503 B1 | 8/2006 | Bloomquist et al. |
| 7,093,020 B1 | 8/2006 | McCarty et al. |
| 7,117,239 B1 | 10/2006 | Hansen |
| 7,137,006 B1* | 11/2006 | Grandcolas et al. ........ 713/180 |
| 2001/0011255 A1 | 8/2001 | Asay et al. |
| 2001/0012974 A1 | 8/2001 | Mahaffey |
| 2001/0027474 A1 | 10/2001 | Nachman et al. |
| 2001/0032184 A1 | 10/2001 | Tenembaum |
| 2001/0047295 A1 | 11/2001 | Tenembaum |
| 2001/0051917 A1 | 12/2001 | Bissonette et al. |
| 2001/0054003 A1 | 12/2001 | Chien et al. |
| 2002/0007313 A1 | 1/2002 | Mai et al. |
| 2002/0007460 A1 | 1/2002 | Azuma |
| 2002/0010599 A1 | 1/2002 | Levison |
| 2002/0010668 A1 | 1/2002 | Travis et al. |
| 2002/0018585 A1 | 2/2002 | Kim |
| 2002/0019938 A1 | 2/2002 | Aarons |
| 2002/0023108 A1 | 2/2002 | Daswani et al. |
| 2002/0029269 A1* | 3/2002 | McCarty et al. ............ 709/225 |
| 2002/0032613 A1 | 3/2002 | Buettgenbach et al. |
| 2002/0032650 A1 | 3/2002 | Hauser et al. |
| 2002/0059141 A1 | 5/2002 | Davies et al. |
| 2002/0077978 A1 | 6/2002 | O'Leary et al. |
| 2002/0087447 A1 | 7/2002 | McDonald et al. |
| 2002/0095443 A1 | 7/2002 | Kovack |
| 2002/0099826 A1 | 7/2002 | Summers et al. |
| 2002/0104006 A1 | 8/2002 | Boate et al. |
| 2002/0104017 A1 | 8/2002 | Stefan |
| 2002/0107788 A1 | 8/2002 | Cunningham |
| 2002/0152163 A1 | 10/2002 | Bezos et al. |
| 2002/0165949 A1 | 11/2002 | Na |
| 2002/0174010 A1 | 11/2002 | Rice, III |
| 2002/0184507 A1 | 12/2002 | Makower et al. |
| 2002/0188869 A1 | 12/2002 | Patrick |
| 2002/0191548 A1 | 12/2002 | Ylonen et al. |
| 2002/0198806 A1 | 12/2002 | Blagg et al. |
| 2003/0001888 A1 | 1/2003 | Power |
| 2003/0018915 A1 | 1/2003 | Stoll |
| 2003/0023880 A1 | 1/2003 | Edward et al. |
| 2003/0034388 A1 | 2/2003 | Routhenstein et al. |
| 2003/0037131 A1* | 2/2003 | Verma ........................ 709/223 |
| 2003/0037142 A1 | 2/2003 | Munger et al. |
| 2003/0040995 A1 | 2/2003 | Daddario et al. |
| 2003/0046587 A1 | 3/2003 | Bheemarasetti et al. |
| 2003/0046589 A1 | 3/2003 | Gregg |
| 2003/0051026 A1 | 3/2003 | Carter et al. |
| 2003/0055871 A1 | 3/2003 | Roses |
| 2003/0070069 A1 | 4/2003 | Belapurkar et al. |
| 2003/0070084 A1 | 4/2003 | Satomaa et al. |
| 2003/0074580 A1 | 4/2003 | Knouse et al. |
| 2003/0079147 A1 | 4/2003 | Hsieh et al. |
| 2003/0084345 A1 | 5/2003 | Bjornestad et al. |
| 2003/0084647 A1 | 5/2003 | Smith et al. |
| 2003/0088552 A1 | 5/2003 | Bennett et al. |
| 2003/0105981 A1* | 6/2003 | Miller et al. ................ 713/202 |
| 2003/0110399 A1 | 6/2003 | Rail |
| 2003/0115160 A1 | 6/2003 | Nowlin et al. |
| 2003/0119642 A1 | 6/2003 | Gates et al. |
| 2003/0154403 A1 | 8/2003 | Keinsley et al. |
| 2003/0159072 A1 | 8/2003 | Bellinger et al. |
| 2003/0163700 A1* | 8/2003 | Paatero ....................... 713/175 |
| 2003/0163733 A1 | 8/2003 | Barriga-Caceres et al. |
| 2003/0177067 A1 | 9/2003 | Cowell et al. |
| 2003/0191549 A1 | 10/2003 | Otsuka et al. |
| 2004/0031856 A1 | 2/2004 | Atsmon et al. |
| 2004/0049702 A1 | 3/2004 | Subramaniam et al. |
| 2004/0117409 A1 | 6/2004 | Scahill et al. |
| 2005/0074126 A1* | 4/2005 | Stanko ........................ 380/279 |
| 2005/0080747 A1 | 4/2005 | Anderson et al. |
| 2005/0082362 A1 | 4/2005 | Anderson et al. |
| 2005/0086160 A1 | 4/2005 | Wong et al. |
| 2005/0086177 A1 | 4/2005 | Anderson et al. |
| 2005/0120180 A1 | 6/2005 | Schombach et al. |
| 2005/0204148 A1* | 9/2005 | Mayo et al. ................ 713/185 |
| 2005/0278641 A1 | 12/2005 | Mansour et al. |
| 2006/0075473 A1* | 4/2006 | Moreh et al. .................. 726/5 |

FOREIGN PATENT DOCUMENTS

| | | |
|---|---|---|
| DE | 19731293 | 1/1999 |
| EP | 0855659 | 7/1998 |
| EP | 0884877 | 12/1998 |
| EP | 0917119 | 5/1999 |
| EP | 1014318 A2 | 6/2000 |
| EP | 1022664 | 7/2000 |
| EP | 1056043 | 11/2000 |
| EP | 1089516 | 4/2001 |
| JP | H10-187467 | 7/1998 |
| JP | 200324329 | 11/2000 |

| | | |
|---|---|---|
| JP | 2001134672 | 5/2001 |
| JP | 2005-242976 | 9/2005 |
| WO | WO 97/43736 | 11/1997 |
| WO | WO 99/40507 A1 | 8/1999 |
| WO | WO 99/52051 | 10/1999 |
| WO | WO 00/68858 | 11/2000 |
| WO | WO 01/18656 A1 | 3/2001 |
| WO | WO 01/35355 | 5/2001 |
| WO | WO 01/43084 | 6/2001 |
| WO | WO 01/88659 | 11/2001 |
| WO | WO 02/17082 A1 | 2/2002 |
| WO | WO 2004/079603 | 9/2004 |

OTHER PUBLICATIONS (Author unknown), Netscape Communications Corporation, "How SSL Works", (Date unknown), http://developer.netscape.com/tech/security/basics/index.html.
(Author unknown), RSA Security Inc., Crytography in the Real World, "5.3.2 What are the ITU-T (CCITT) Standards?", (Date unknown), www.rsasecurity.com/rsalabs/faq/5-3-2.html.
(Author unknown), RSA Security Inc., Crytography in the Real World, "5.1.2 What is SSL?", (Date unknown).
Author unknown, Cybertrust, "Public Key Technology Overview", (Date unknown).
(Author unknown), VeriSign, "Establish Trust to Protect and Grow Your Online Business", (Date unknown), www.verisign.com/resources/gd/authentication/authentication.html.
(Author unknown), VeriSign, "Secure and E-Commerce-Enable Your Web Site", (Date unknown).
Kutler, A Different Drummer on the Data Highway, American Banker, Section: No. 91, vol. 160, May 12, 1995, p. 14.
Epper, A Player Goes After Big Bucks in Cyberspace, American Banker, vol. 160, No. 86, ISSN: 0002-7561, May 5, 1995, p. 17.
Berry et al., A potent new tool for selling databse, Business Week, Cover Story, Sep. 5, 1994, pp. 56-62.
Applets, java.sun.com, May 21, 1999.
Associates National Bank (DE) Credit Card, The Associates, www.theassociates.com/consumer/credit_cards/main.html, Apr. 6, 1999, 6 pages.
At Your Request, www.wingspanbank.com, Sep. 28, 1999.
Anonymous, Aversion Therapy: Banks Overcoming Fear of the 'Net to Develop Safe Internet-based Payment System w/ Netscape Communicator, Network World, ISSN: 0887-7661, Dec. 12, 1994.
JAVA, Banking on JAVA(™) Technology, java.sun.com, May 21, 1999.
Bechtel Construction Operations Incorporated Standardizes on Primavera's Expedition Contract Management Software, Business Wire, Jul. 27, 1999.
Fasaro, Roberta, Builders Moving to Web tools Computerworld, Nov. 16, 1998, vol. 32, No. 46, pp. 51, 53.
Anonymous, CORBA Overview, arch2.htm at pent21.infosys.tuwien.ac.at, May 25, 1999.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Marlin, Chasing Document Management, Inform, vol. 13, No. 4, Apr. 1999, p. 76-82.
Consortium Created to Manage Common Electronic Purse Specifications, http://www.visa.com/av/news/PRmisc051199.vhtml, printed Feb. 23, 2001.
Construction Financing to Build Your Own Home, ISBN: 0962864307, Jul. 1990.
Civitello Jr., Construction Operations Manual of Policies and Procedures, Third Edition, 2000.
Marchman, Construction Scheduling with Primavera Project Planner, May 25, 1999.
Chester, Cross-platform integration with XML and SOAP, IT PTO Sep.—Oct. 2001.
Mitchell, Cyberspace: Crafting Software . . . , Business Week, Feb. 27, 1999, pp. 78-86.

Friedman, Dictionary of Business Terms, Barron's Third Edition, Copyright 2000.
Strassel, Dutch Software Concern Experiments with Electronic 'Cash'in Cyberspace, The Wall Street Journal, Apr. 17, 1995.
Post, E-Cash: Can't Live With It, Can't Live Without It, The American Lawyer, Mar. 1, 1995, pp. 116-117.
Thomas, Enterprise JAVABEANS(™) Technology: Server Component Model for the Java(™) platform, java.sun.com, May 2, 1999.
Seibert, Paul, Facilities Planning & Design for Financial Institutions Bankline Publications, 1996, ISBN: 1-55738-780-X.
Owen, David, Facilities Planning & Relocation RSMeans, 1993, ISBN: 0-87629-281-3.
Maize, Fannie Mae on the Web, Document ID: 52079, May 8, 1995.
FreeMarkets, printed on Apr. 26, 1999.
The Gale Group, G&D America's Multi-application Smart Card Selected for Combined Payroll and 'Virtual Banking' Program in Mexico, Business Wire, Apr. 24, 1998, p2411047.
Getting Smart with Java: Sun Micro Says American Express to Use Java for Smart Card, ABCNews.com, printed on Jun. 6, 2000.
Getting Started: Specific GE TPN Post Service Use Guidelines, printed on Apr. 26, 1999.
Harris, Harris InfoSource, printed on Apr. 26, 1999.
Knowles, Improved Internet Security Enabling On-Line Commerce, PCWeek, vol. 12, No. 11, ISSN: 0740-1604, Mar. 20, 1995.
Meredith, Internet bank moves closer to virtual reality, USA Today, May 5, 1995.
Larsen, Amy, Internet goes to Work for Builders, InterWeek, Nov. 16, 1998, Issue 741.
Radosevich, Is Work Flow Working?, CNN.com, Apr. 6, 1999 at <http://www.cnn.com/TECH/computing/9904/06/workflow/ent.idg, p. 1 of 5, retrieved from the internet on Nov. 28, 2005.
JAVA, JAVA(™) Technology in the Real World, java.sun.com, May 21, 1999.
JAVA, JAVA(™) Remote Method Invocation (RMI) Interface, java.sun.com, May 32, 1999.
JAVA, JAVA(™) Servlet API, java.sun.com, May 21, 1999.
Frank, John N. Frank, Beyond Direct Mail, Credit Card Management, vol. 9, Iss. 5, Aug. 1996, 4pgs.
OMG, Library, www.omg.com, May 25, 1999.
Mary C. Lacity, et al., Mary C. Lacity, et al., The Information Systems Outsourcing Bandwagon, Sloan Management Review, vol. 35, No. 1, Fall 1993, p. 73-86.
Method of Protecting Data on A Personal Computer, IBM Corporation, TDB 11-85, Order 85A 62426, Nov. 1, 1995, p. 2530.
Clark, Microsoft, Visa to Jointly Develop PC Electronic-Shopping Software, The Wall Street Journal, Nov. 9, 1994, Nov. 9, 1994 WSJ B9.
Sirbu, et al, NetBill: An Internet Commerce System Optimized for Network Delivered Services, printed on Feb. 27, 1995.
Mitchell, Netlink Goes After An Unbanked Niche, Card Technology, ISSN: 1093-1279, Sep. 1999, p. 22.
Barnham, Network Brings Together Producers and Companies, Document ID: 17347, Apr. 26, 1999.
Houlder, OFT Gives the Individual Top Priority: Report Calls for Deregulation of Business Lending, Document ID: 91716, Jun. 8, 1994.
OMWARE, Inc., Web Pages, Feb. 2000, Retrieved from http://web.archive.org/web20000226033405/www.omware.com/products.html, Retrieved from the interneet on Nov. 28, 2005.
Anonymous, Overview of CORBA, May 25, 1999.
Harris, Planning Using Primavera Project Planner P3 Version 3.0, User Guide, Copyright 1999 by Eastwood Harry Pty Ltd., 1999.
Point for Windows Version 3.x Interface Marketing Guide.pdf, Dec. 8, 1999.
Johnston, Pondering Passport: Do You Trust Microsoft With Your Data?, www.pcworld.com/resource/printable/article/0.aid,63244,00.asp, Sep. 24, 2001.
Primavera Systems Delivers Expedition Express,Business Wire, Feb. 23, 1999.
Primavera Systems, Inc.—How the World Manages Projects, Expedition Contract Control Software, www.primavera.com, Jun. 23, 2005.

Primavera and PurchasePro.com to Create E-Commerce Marketplace for Construction Industry, Primavera Ships P3, version 3.0, www.purchasepro.com/, Sep. 21, 1999, pp. 1-3.

Product Data Integration Technologies, Inc., Step Integratin Authors, printed on Apr. 26, 1999.

Resource Center: Consolidated Edison Selects GE TPN Post, printed Apr. 26, 1999.

Kormann, Risks of the Passport Single Signon Protocol, Computer Networks, Elsevier Science Press, vol. 33, Sep. 20, 2003, pp. 51-58.

SBA: Pro-Net, U.S. Small Business Administration Procurement Marketing and Access Network, Last Modified: Apr. 1, 1999.

Jepsen, SOAP Cleans up interoperability problems on the web, IT PTO, Jan./Feb. 2001.

Safe Single-Sign-On Protocol with Minimal Password Exposure No Decryption and Technology Adaptivity, IBM Corporation, TDB Mar. 1995, Order 95A, Mar. 1, 1995, pp. 245-248.

Deckmyn, Dominique, San Francisco manages $45M project via web-based Service, Computerworld, Aug. 9, 1999, vol. 33, No. 32, p. 14.

Sun Microsystems, Inc., Schema for Representing CORBA Objects in an LDAP directory, May 21, 1999, pp. 1-9.

Jakobsson et al., Secure and lightweight advertising on the web, Computer Networks, 31 (1999) 1101-1109.

Servlet/Applet/HTML Authentication Process with Single Sign-On, IBM Corporation, IBM Order: 00A6004, Jan. 1, 2000.

Shibata, Seventh International Conference on Parallel and Distributed Systems: Workshops, IEEE Computer Society, Jul. 4-7, 2000.

Siebel, Siebel: Ensuring Customer Success, www.siebel.com, Nov. 17, 1999.

SmartAxis, How it works, http://www.smartaxis.co.uk/seller/howitworks.html, printed on Feb. 23, 2001.

Mosig, Richard, Software Review: the Construction Project Manager Cost Engineering, Jan. 1996, vol. 38, No. 1, pp. 7-8.

Hernandez, Tomas et al., Software Solutions Building Design & Construction, Nov. 1999, vol. 40, No. 11, pp. 38-40.

Thomas Publishing Company, SoluSource: For Engineers By Engineers, Thomas Publishing Company, Apr. 26, 1999.

JAVA, Staying in Touch with JNDI, java.sun.com, May 21, 1999.

Summary of The At Your Request Architecture, First USA Bank Confidential and Proprietary, Apr. 2, 1999, pp. 1-8.

Taylor, Telecommunications Demand Analysis in Transition, Proceedings of the 31st Hawaii International Conference on System Sciences, vol. 5, Jan. 6-9, 1998, pp. 409-415.

Temporary Global Passwords, IBM Corporation, IBM TDB v36, n3, Mar. 1993, Order 93A 60636, Mar. 1, 1993, pp. 451-454.

Cotts, David, The Facility Management Handbook Second Edition AMACM, 1998, ISBN: 0-8144-030-8.

JAVA, The JDBC(™) Data Access API, java.sun.com, May 21, 1999.

Carden, Philip, The New Face of Single Sign-on, Network Computing, http://www.networkcomputing.com, printed Dec. 29, 2000, 4 pages.

The check is in the email, Information Today, vol. 12, No. 3, ISSN: 8755-6286, 03/01995.

Thomas Publishing Company, ThomasNet, Apr. 26, 1999.

Ritz, Total Construction Project Management, McGraw-Hill, 1994.

Welcome to MUSE, Apr. 26, 1999.

OMG, Welcome to OMG's CORBA for Beginners Page!, www.omg.co, May 25, 1999.

OMG, What is CORBA?, www.omg.com, May 25, 1999.

Fujimura et al., XML Voucher: Generic Voucher Language, Feb. 2003.

eCharge, eCharge Corporation, www.echarge.com, Dec. 3, 1999.

* cited by examiner

SYSTEM AND METHOD FOR SINGLE SESSION SIGN-ON WITH CRYPTOGRAPHY

This application claims priority to U.S. Provisional Patent Application Ser. No. 60/365,430, filed Mar. 18, 2002, entitled System And Method For Single Session Sign-On With Cryptography, the disclosure of which is incorporated herein by reference.

BACKGROUND

1. Field of the Invention

The present invention relates to the authentication of users accessing computer systems, particularly where a single user may wish to access several computer systems without the need to authenticate separately to each system, this is commonly referred to as single sign-on. More particularly, the invention relates to single sign-on using public key cryptography.

2. Description of the Related Art

Authentication is the process by which a computer system assures itself that it knows the true identity of the person accessing it. This is typically achieved by requiring the user to demonstrate possession of some fact or object, such as a secret password. Once the user has authenticated in this way the computer system can allow access to the appropriate resources based on its knowledge of who the user is.

The development of stateless protocols, particularly the Hypertext Transport Protocol (HTTP), makes the process of maintaining the knowledge of the user's identity more difficult, and results in a need for the user's client application (e.g., a web browser) to present some proof of the user's identity with each request to a server application. It would be highly inconvenient for the user to be asked to re-enter a password for each request. Therefore, mechanisms have been developed to allow the client browser to retain some token, which can be automatically presented with each request as evidence of the user's true identity.

One such mechanism is to create a "cookie" when the user authenticates to the server for the first time. This cookie is a piece of data, which the browser retains and resubmits with each subsequent request, and which the server application can validate to assess the user's identity. This is a frequently used method because it is supported by most client browsers and is not overly intrusive to the user. However, it is vulnerable to a number of attacks and does not work well across server applications in different Internet domains.

A second such mechanism uses client certificates, defined by CCITT Recommendation X.509. A client certificate is a statement of the identity of the user which has been digitally signed by a trusted third party (the Certification Authority). Asymmetric cryptographic techniques, such as public/private key, are used to implement client certificates. These asymmetric techniques are generally much more robust than the symmetric cryptographic techniques used by cookie based schemes. Asymmetric cryptographic techniques using client certificates also allow the implementation of signing and non-repudiation functions. Client certificates are not widely used however, because they must be installed on the user's computer, are not well understood by most users, and if implemented badly may be very insecure.

Because client certificates are issued and valid for an extended period of time, they are stored and retained in non-volatile and persistent memory on a user's computer. Normally, this is the user computer's hard drive. The need to install a client certificate on a user's computer is inconvenient and prevents user mobility. Additionally, client certificates may be insecure where more than one user shares a computer. The complexity of client certificates, and the general lack of understanding of them means that users can frequently be tricked into copying the secret key data, which enables an intruder to masquerade as the user. This can be done by an intruder pretending to be a service engineer and simply asking the user to copy some files for analysis. While most users would be suspicious of a stranger asking them for their password, they often do not recognize a request to copy files as suspicious.

With client certificates, the browser does not know which client certificate (where there is more than one) to send to any particular server. This means that the client browser displays a dialog box asking the user which client certificate to send. This is a particular problem for users that work with multiple servers. These servers may be competitors and presentation or use of the client certificate associated with a competitor may be undesirable.

With client certificates, a Public Key Infrastructure (PKI) is required so that lost or compromised client certificates can be revoked, and expired client certificates can be re-issued. Known PKIs have proved to be complex and expensive and many companies have given up and scrapped them.

What is needed is a system and method to support authentication that provides many of the advantages of client certificates without many of the disadvantages.

BRIEF DESCRIPTION OF THE DRAWINGS

The foregoing features and other aspects of the invention are explained in the following description taken in conjunction with the accompanying figures wherein.

It is understood that the drawings are for illustration only and are not limiting.

DETAILED DESCRIPTION OF THE DRAWINGS

Figure 1:
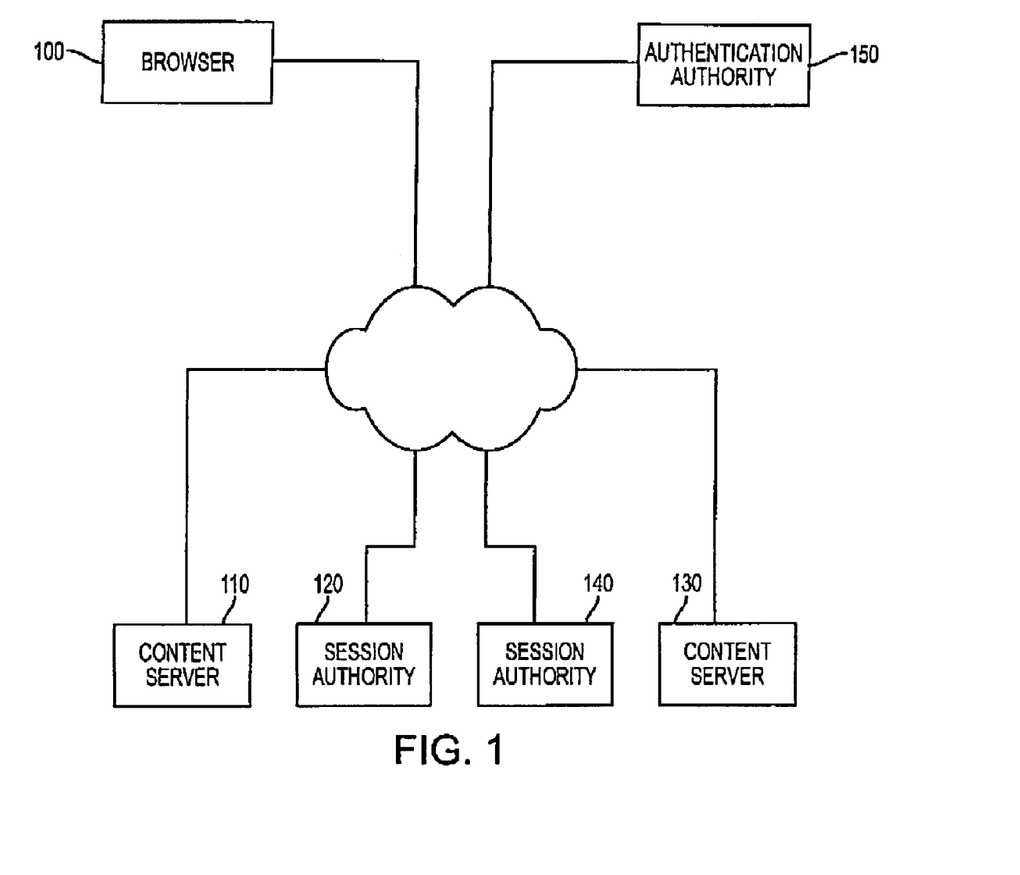
FIG. 1 illustrates a system according to one embodiment of the invention.
Figure 2A:
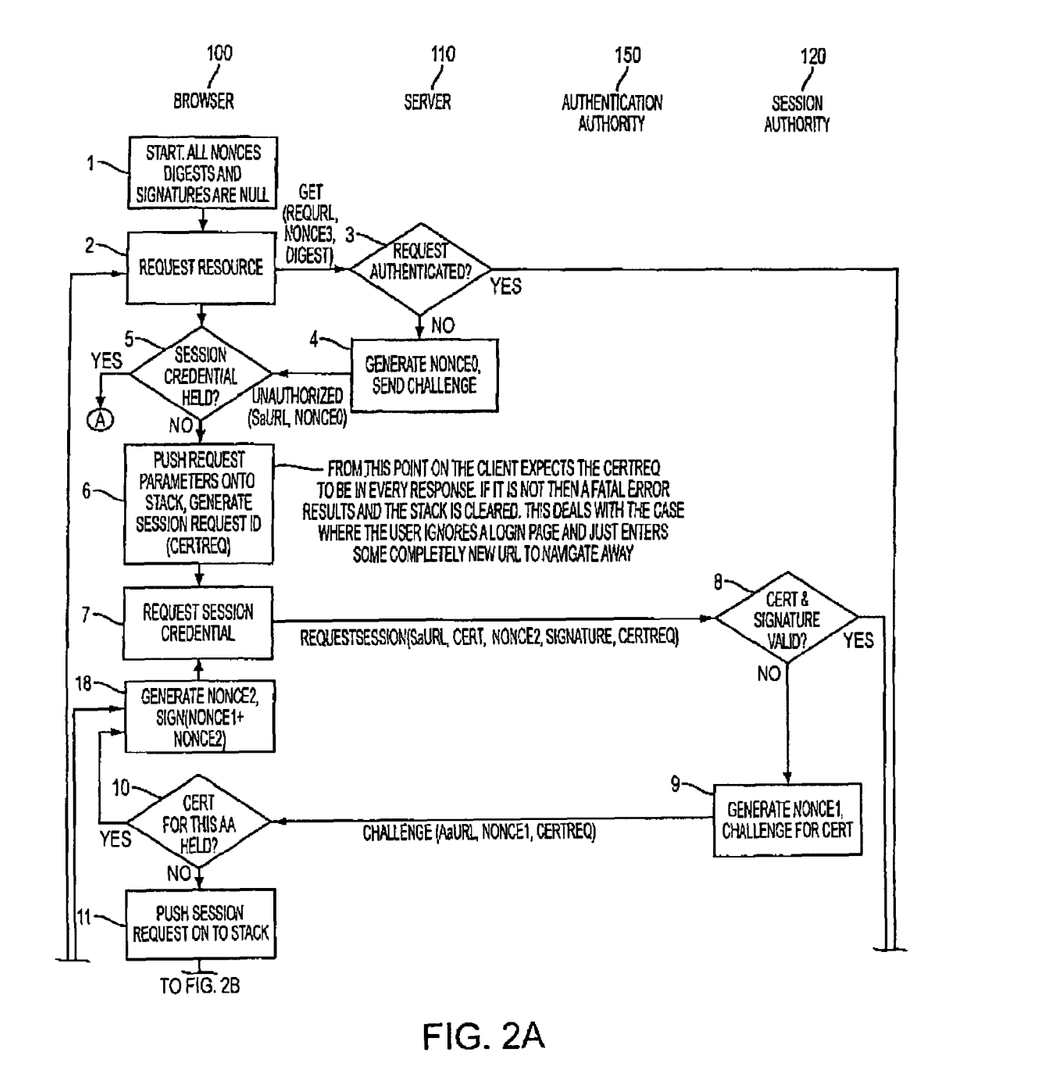
FIGS. 2A and 2B illustrate a method according to one embodiment of the invention.
Figure 2B:
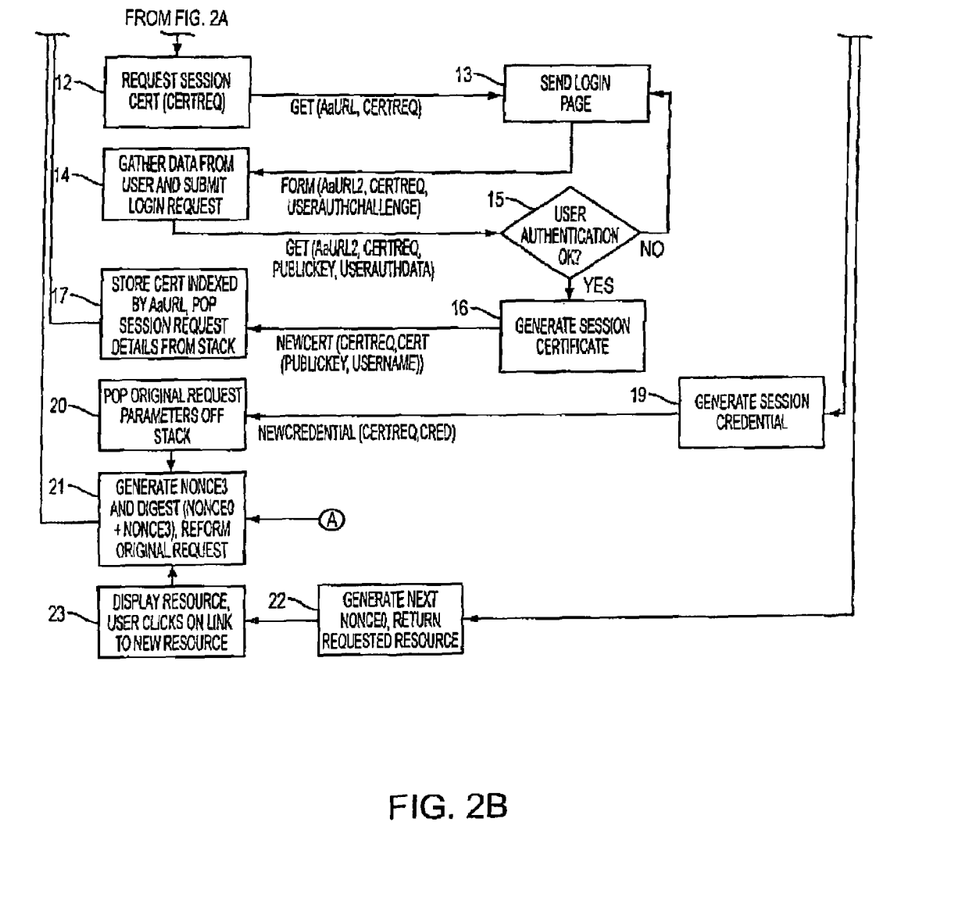

To understand the various embodiments of the invention, it is helpful to refer to FIGS. 1 and 2, which illustrate various embodiments.

Browser 100 is the client application running on the user's computer, which acts on behalf of the user. Content server 110 provides and controls access to some restricted or protected content, which the user wishes to access. Session Authority 120 is responsible for maintaining user session state on behalf of server 110. Content server 130 provides and controls some other restricted or protected content, which the user wishes to access, and Session Authority 140 provides the session state management for server 130. In this embodiment, server 110 and Session Authority 120 are tightly coupled, and server 130 has its own Session Authority 140. Although illustrated as separate entities, it is possible for server 110 and Session Authority 120 to be parts of the same server. Other embodiments are also possible where a single Session Authority is shared between multiple content servers.

Authentication Authority 150 is responsible for providing the actual authentication of users on behalf of Session Authorities 120 and 140. In this embodiment, one Authentication Authority 150 is shared to provide a single sign-on domain for servers 110, 120, 130, 140. Other embodiments where Session Authorities have separate Authentication Authorities are also possible.

Throughout the following description a number of nonces are generated and used. A nonce is a randomly generated number, which one party in a cryptographic exchange chooses and must be included in a cryptographic operation by the other party. This technique is used to prevent a "known plain text attack" by the second party. In general, both parties should provide a nonce, thereby protecting from such an attack by either party.

Referring to FIG. 2, at step 1, browser 100 generates a public/private key pair (the session keys). Generally, this key pair is a random key pair, and is used for a single session. The process of generating public/private key pairs is not central to the invention and the techniques are known. Such techniques are discussed in B. Schneier, Applied Cryptography: Protocols, Algorithms, and Source Code in C, 2nd Edition, Wiley, 1995, the disclosure of which is incorporated herein by reference. The RSA public-key cryptosystem is a popular form of public-key cryptography. RSA stands for Rivest, Shamir, and Adleman, who are credited with inventing the RSA public key cryptosystem.

At step 2, browser 100 requests resource1 from content server 110, providing no session credential to support authentication.

Resource1 is a protected or restricted resource, and content server 110 controls access to Resource1. At step 3, content server 110 determines that access to resource1 requires authentication and checks for a session credential as the authentication in the request for resource1.

If content server 110 determines that there is no session credential to support authentication, then at step 4, content server 110 sends back a challenge to browser 100. The challenge includes the name (URL) of the Session Authority that is used by content server 110. Content server 110 also generates and includes nonce0, (a "nonce" is a random piece of data that is different for each client browser) and the type of authentication that content server 110 requires. The type of authentication is discussed in greater detail below.

At step 5, browser 100 determines whether it has a current session credential from the Session Authority that is used by content server 110. If browser 100 determines that it has a session credential, then at step 21, browser 100 reforms the original request to include the required session credential.

If browser 100 determines that it does not have a current session credential from the Session Authority used by content server 110, then at step 6, browser 100 saves the address of the requested resource1, and generates a certificate request identifier or ID, which is a number, unique within browser 100.

From this point at step 6, until the authentication is complete at step 21, all server responses must contain this certificate request ID. If for any reason the user intervenes by for example entering the URL of some totally unrelated server, then the certificate request ID will not be present in the server response and the browser will be able to detect that the authentication sequence has been aborted. If the authentication sequence is aborted, browser 100 discards all retained state information for the session.

At step 7, browser 100 sends a request for a session credential to Session Authority 120, whose URL was provided at step 4 in the authentication challenge from server 110. This first request to Session Authority 120 in step 7 contains the certificate request ID generated by browser 100 at step 6, but no other information.

At step 8, Session Authority 120 checks for a valid session certificate in the request, which is not present, and proceeds to step 9, where it generates nonce1 and challenges for a session certificate, providing the URL of Authentication Authority 150, and nonce1.

At step 10, browser 100 checks to see if it holds a valid session certificate from Authentication Authority 150, which it does not. Browser 100 then proceeds to step 11, where it saves the address of Session Authority 120, and at step 12 makes a request to Authentication Authority 150 for a session certificate.

If browser 100 did hold a valid session certificate from Authentication Authority 150, then as described below, at step 18, it would generate nonce2, and a signature of nonce1 and nonce2.

At step 13, Authentication Authority 150 challenges the user to identify themselves. This can be achieved in a variety of ways such as requiring the user to enter a password. Whatever method is used, the challenge from Authentication Authority 150 will include the certificate request ID that browser 100 generated at step 6.

At step 14, the user receives the challenge and in response provides the password or other authentication data. Browser 100 submits this information together with the public session key to Authentication Authority 150 to request a session certificate. The public session key that browser 100 includes in this step is the public session key that was generated at step 1. Although not a requirement in the invention and not illustrated, browser 100 may also sign part of the submission with the private session key that was generated at step 1.

At step 15, Authentication Authority 150 authenticates the user of browser 100 to satisfy itself that the user is who they say (how it does this is outside the scope of this method).

After authenticating the user of browser 100, then at step 16, Authentication Authority 150 creates a session certificate including the public session key that browser 100 included in the request, and returns the session certificate to browser 100. Although not illustrated, Authentication Authority 150 may encrypt or sign the session certificate.

At step 17, browser 100 stores the new session certificate in non-persistent volatile memory, indexed by the address of Authentication Authority 150. Browser 100 then retrieves the details of the session credential request saved in step 11, and at step 18 generates nonce2, and a signature of nonce1 and nonce2 using the secret or private session key. This signature demonstrates that browser 100 is in possession of the secret or private session key that it generated at step 1. The use of 2 nonces (nonce1 and nonce2) helps to prevent a known plain text attack on that private or secret key.

At step 7, browser 100 submits a new request for a session credential which includes nonce2, the signature of nonce1 and nonce2, and the session certificate provided by Authentication Authority 150, which itself includes the session public key generated at step 1.

At step 8, Session Authority 120 verifies that the signature is valid, using the session public key contained in the session certificate.

At step 19 Session Authority 120 then extracts the user identity from the session certificate and creates a session credential, which contains the user identity and a Message Authenticity Code (MAC). This MAC is created using a secret key known to both Session Authority 120 and content server 110, and which can be reliably verified by content server 110. The mechanism of key exchange between Session Authority 120 and content server 110 is outside the scope of this protocol and must be secure and reliable. It is assumed that Session Authority 120 and content server 110 are closely coupled to facilitate this exchange. The key used by Session Authority 120 in step 19 may be a symmetric key or part of an asymmetric key pair.

At step 20, browser 100 receives the session credential from Session Authority 120, indexed by the URL of Session Authority 120. The session credential is retained in non-persistent or volatile memory, and is not saved to a persistent storage device such as a hard drive. Browser 100 also retrieves the resource1 request details saved in step 6.

At step 21 browser 100 generates nonce3, and calculates a MAC depending on the authentication type required by server 110 in step 4. The MAC demonstrates that browser 100 has possession of the private or secret session key that was generated at step 1. Browser 100 then reforms the request for resource1, and resubmits the request at step 2.

In one embodiment, browser 100 calculates the MAC at step 21 upon at least nonce0 and nonce3. Calculating the MAC upon nonce0 and nonce3 is an efficient method, but is vulnerable to a "replay attack" when an intruder could submit the same request to server 110 multiple times.

In another embodiment, the MAC also includes the URI of the request for resource1. Including the URI of the request in the MAC helps to ensure that the same MAC cannot be used by an attacker to request a different resource.

In another embodiment, the MAC also includes the content of the request for resource1.

In another embodiment, at step 22, server 110 produces a new value of nonce0 for each request ("one time nonces"). This is slightly less efficient (as browser 100 has to calculate a new MAC for each request), but prevents a "replay attack".

Finally, if required by the authentication type demanded by content server 110 in step 4, browser 100 may calculate a digital signature of the entire request content and nonce0 and nonce3. This is the most computationally expensive option, but it provides full non repudiation of the request to content server 110, and might be appropriate for example, where the content of the request is an order or other instruction to the server to act in some way on behalf of the client.

In one embodiment, a dependable time service is included to get the request "notarized" and dated.

At step 3, content server 110 again checks the request for resource1. This time, finding that the request includes a valid session credential, content server 110 determines that the user is entitled to requested resource1.

At step 22, content server 110 returns requested resource1 to browser 100, where resource1 is displayed at step 23.

In one embodiment of the invention, the session credentials or session certificates last for only the duration of the session. A session is considered to be the time that a browser application is running, terminating when the browser application is closed, stops or ends. In this sense, the session credentials or session certificates are volatile, existing only during a specific event and becoming invalid or ceasing to exist after that event ends. This helps to ensure that the session credentials or session certificates do not carryover into a new session after the user terminates the browser application.

In another embodiment, the session credentials or session certificates last for a limited time, such as no more than a short number of hours (e.g, 8 hours). In this sense, the session credentials or session certificates are also volatile. This helps to ensure that the session credentials or session certificates do not carry-over into a new day in the event that the browser application is not closed.

In another embodiment, the session credentials or session certificates are held in RAM of browser 100, but are not written to or stored on magnetic media, such as a hard disk, compact flash, floppy disk, or other form of memory that would retain the information without application of power. In this sense, the session credentials or session certificates are not stored in any form of persistent memory. This helps to ensure that the session credentials or session certificates do not survive a power-down cycle of the user's computer.

In another embodiment, the session credentials or session certificates are re-issued for each session login. Further, there is no way to export or copy the session credential or session certificate. Each of these features may require some modification to existing browser software.

The content server 110 tells the browser 100 the particular Session Authority 120 used by content server 110. Session Authority 120 in turn tells the browser, which Authentication Authority 150 it wants to use. If the browser is already holding a session credential for content server 110 and one for content server 130, it knows to send the correct session credential for that content server without asking the user.

Using a consistent protocol by vendors of standard browsers, all a user needs is a conforming browser. The user does not need to install anything on the user desktop, such as programs and data (e.g., client certificates).

Further, no PKI is required, session credentials and session certificates have a very limited life time, so revocation is less of an issue, and the session credential or session certificate is issued at every login, so reissuing expired credentials or certificates is not a significant problem.

There are similar methods of web based authentication. One of these methods is described at: http://www.ietf.org/rfc/rfc2069.txt ("RFC 2069"). The method described in RFC 2069 includes use of nonces and digests to authenticate users to web sites, and relies upon the user and each server knowing the users' password. According to some, the method of RFC 2069 is not considered a "strong cryptography" technique.

The method of the invention uses a public/private key approach in addressing the problem. This means that only the browser ever knows the user's private key and enables non-repudiation. (The strength of the non-repudiation is dependent on the rigor of the authentication performed by the Authentication Authority. Reliable authenticators such as smart cards and biometrics exist and can be used by the Authentication Authority).

The invention includes the idea of a Session Authority and the fact that the content server decides which Session Authority to use. The Session Authority decides which Authentication Authority to use. The content servers "trust" the Session Authority they want to use, and must know (reliably, and by some mechanism not included here) the public key of the Session Authority or a shared key known to both the content server and the Session Authority. This enables the browser to work out which session credential to send without having to ask the user questions they do not understand. The content servers do not need to know anything about the users, they need no shared secrets, in fact the Session Authority can mask the true identity of the user from the content servers, and for some business models this is advantageous. The Session Authority can also provide payment collection services so that, for example, a Session Authority can know who the user is and their credit card or payment details. A merchant can know the user only as some alias. The user can buy products from this site, which can ask for payment from the Session Authority, without telling the Session Authority what the user is buying. Nobody can tell that the user is a consumer of these products. This method does not directly address the payment mechanism, but can provide reliable authentication without the service provider knowing the user's true identity.

The fact that the content server decides which Session Authority to use facilitates single session sign-on across arbitrary groups of service providers. This is frequently important. For example, an airline would like it's users to be able to book hotel rooms and car hire, without having to log in again. If the airline, hotel and car hire company all use the same Session Authority then this happens automatically. The method is cryptographically reliable and not subject to the weaknesses of some cookie based SSO solutions. Further, the method does not require any "back channel" communication. Back channel is where, to enable the SSO to work, the airline and the hotel must talk directly to each other to exchange information about the identity of users.

To implement some of the various embodiments, browsers must: Understand the notion of a session credential and a session certificate, and maintain an in-memory list of current session certificates indexed by Authentication Authority and current session credentials indexed by Session Authority; Implement the HTTP protocol extensions to understand the server challenge for a session certificate or a session credential; Make a request to an Authentication Authority to get a session certificate; Understand the Authentication Authority response; Store the session certificate; Format an appropriate request to the server including the correct response to the session certificate challenge; Make a request to an Session Authority to get a session credential; Understand the Session Authority response, Store the session credential; and Format an appropriate request to the server including the correct response to the session credential challenge.

To implement some of the various embodiments, content servers must: Understand the concept of session credentials and Session Authority; Know which Session Authority they use; Know the public key of it's Session Authority; Implement the HTTP protocol extensions to understand how to check for and interpret a session credential challenge response; and Understand how to frame a session credential challenge.

To implement some of the various embodiments, Authentication Authority's must: Understand session certificates; Implement the HTTP protocol extensions to understand a request to issue a session certificate; Format the response to correctly send back an issued session certificate to the browser; and Implement some form of user authentication.

To implement some of the various embodiments, Session Authority's must: Understand session credentials; Implement the HTTP protocol extensions to understand a request to issue a session credential; and Format the response to correctly send back an issued session credential to the browser.

Although illustrative embodiments have been described herein in detail, it should be noted and will be appreciated by those skilled in the art that numerous variations may be made within the scope of this invention without departing from the principle of this invention and without sacrificing its chief advantages.

In the example descriptions and illustrations, some steps have included encryption and/or signatures using symmetric keys or public/private key pairs. Other steps have not included encryption and/or signatures. It is understood that for any number of purposes, encryption or signatures using either symmetric keys or a public/private key pair may be desirable for any of the described steps, and those additional steps are specifically envisioned, although they may not be expressly described, illustrated or claimed.

Unless otherwise specifically stated, the terms and expressions have been used herein as terms of description and not terms of limitation. There is no intention to use the terms or expressions to exclude any equivalents of features shown and described or portions thereof.

I claim:

1. In a computer system including a server system, a session authority and a plurality of content servers, a single sign-on method for enabling a client to access the plurality of content servers by single sign-on during a session, comprising:
   (a) receiving a request for content contained within one of a plurality of content servers from a browser, acting on behalf of a client;
   (b) determining by the content server whether the request comprises a valid session credential; and
   (d) transmitting the content to the browser if the request comprises a valid session credential,
   wherein if the request does not comprise a valid session credential, the method further comprises:
   (d) transmitting by the content server to the browser a challenge, the challenge comprising the name of a session authority that is used by the content server and the type of authentication required by the content server;
   (e) receiving by the session authority a request for the session credential from the browser, the request comprising a certificate request identification; and
   (f) checking by the session authority for a valid session certificate from an authenticating authority in the request for the session credential;
   wherein if the request received by the session authority for the session credential comprises a valid session certificate from the authenticating authority, the session authority creates and transmits to the browser for storage in non-persistent memory a session credential,
   wherein further if the request received by the session authority for the session credential does not comprise a valid session certificate from the authenticating authority, the method further comprises:
   (g) generating a second random piece of data by the session authority;
   (h) transmitting to the browser the second random piece of data generated by the session authority, a challenge for a session certificate and the name of the authentication authority;
   (i) receiving by the session authority from the browser a session certificate generated by the authentication authority, a third random piece of data generated by the browser, a signature created using a private session key that was generated by the browser as part of a public/private session key pair and applied to the second random piece of data and the third random piece of data and a request for a session credential, where the session certificate comprises the public session key, wherein further the public session key was transmitted to the authentication authority by the browser along with a request for the session certificate;
   (j) verifying by the session authority that the signature received from the browser is valid by using the public session key included in the session certificate;
   (k) extracting the identity of the user of the browser from the session certificate and creating a session credential comprising the user identity and a message authenticity code;
   (l) transmitting the session credential from the session authority to the browser;

(m) receiving by the content server from the browser a request for the requested resource;

(n) determining by the content server whether the request comprises a session credential; and (o) transmitting the content to the browser if the request comprises the session credential, wherein the session credential and session certificate are valid for a predetermined length of time.

2. The method of claim 1, wherein the public/private session key pair is used for a single session.

3. The method of claim 1, wherein the plurality of content servers transmit the name of the same session authority to a plurality of browsers.

4. The method of claim 3, wherein the plurality of content servers comprise arbitrary groups of service providers.

5. The method of claim 1, wherein either or both of the session credential and session certificate last only for the duration of the session and become invalid upon termination of the browser application.

6. The method of claim 5, wherein either or both of the session credential and session certificate become invalid by ceasing to exist.

7. The method of claim 1, wherein either or both of the session credential and session certificate last only for a limited time and become invalid upon termination of the limited time.

8. The method of claim 7, wherein either or both of the session credential and session certificate become invalid by ceasing to exist.

9. The method of claim 1, wherein either or both of the session credential and session certificate are held only in the RAM of the browser and cease to exist upon termination of a power-down of the client computer.

10. A computer system configured to permit a client to access a plurality of content servers through a single sign-on during a session, comprising:

a server system in communication with a plurality of content servers;

a plurality of content servers in communication with one or more session authorities; and one or more session authorities, wherein the server system is configured to receive a request for content contained within one of a plurality of content servers from a browser acting on behalf of a client and to transmit the request to the content server from which the content is requested, wherein each content server is configured to determine whether the request for content comprises a valid session credential and transmit the content to the browser if the request comprises a valid session credential, wherein if the request does not comprise a valid session credential, each content server is configured to transmit a challenge to the browser, the challenge comprising the name of a session authority that is in communication with the content server and die type of authentication required by the content server;

wherein each session authority is configured to receive a request for a session credential from the browser, the request comprising a certificate request identification, and check for a valid session certificate from an authenticating authority in the request for the session credential;

wherein if the request received by the session authority for the session credential comprises a valid session certificate from the authenticating authority, the session authority is configured to create and transmit to the browser for storage in non-persistent memory a session credential that can be transmitted to the content server in a request for access to the content contained in the content server, wherein further if the request received by the session authority for the session credential does not comprise a valid session certificate from the authenticating authority, the session authority is configured to:

generate a second random piece of data;

transmit to the browser the second random piece of data, a challenge for a session certificate and the name of the authentication authority;

receive from the browser a session certificate generated by the authentication authority, a third random piece of data generated by the browser, a signature created using a private session key that was generated by the browser as part of a public/private session key pair and applied to the second random piece of data and the third random piece of data and a request for a session credential, where the session certificate comprises the public session key, wherein further the public session key was transmitted to the authentication authority by the browser along with a request for the session certificate;

verify that the signature received from the browser is valid by using the public session key included in the session certificate;

extract the identity of the user of the browser from the session certificate and creating a session credential comprising the user identity and a message authenticity code; and transmit the session credential to the browser, wherein the session credential can be transmitted to a content server in a request for access to the content contained in the content server.

11. The system of claim 10, wherein the public/private session key pair is used for a single session.

12. The system of claim 10, wherein the content servers are further configured to transmit the name of the same session authority to a plurality of browsers.

13. The system of claim 12, wherein the content servers comprise arbitrary groups of service providers.

14. The system of claim 10, wherein either or both of the session credential and session certificate last only for the duration of the session and become invalid upon termination of the browser application.

15. The system of claim 14, wherein either or both of the session credential and session certificate become invalid by ceasing to exist.

16. The system of claim 10, wherein either or both of the session credential and session certificate last only for a limited time and become invalid upon termination of the limited time.

17. The system of claim 16, wherein either or both of the session credential and session certificate become invalid by ceasing to exist.

18. The system of claim 10, wherein either or both of the session credential and session certificate are held only in the RAM of the browser and cease to exist upon termination of a power-down of the client computer.

* * * * *